United States Patent [19]
Koeninger et al.

[11] Patent Number: 5,907,674
[45] Date of Patent: *May 25, 1999

[54] METHOD FOR REMOVING PROGRAM-RELATED ERRORS IN PROGRAM-CONTROLLED COMMUNICATIONS SYSTEMS

[75] Inventors: Reinhard Koeninger, Gelsenkirchen; Harald Gericke, Oberhausen, both of Germany

[73] Assignee: Siemens Aktiengesellschaft, Munich, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/650,638
[22] Filed: May 20, 1996
[30] Foreign Application Priority Data May 24, 1995 [DE] Germany .................. 195 19 104

[51] Int. Cl.$^6$ ........................................ G06F 11/00
[52] U.S. Cl. .................. 395/185.1; 395/182.02; 395/183.14; 371/67.1
[58] Field of Search .......... 395/182.02, 182.03, 395/182.04, 182.05, 182.06, 185.1, 182.13, 182.14, 182.15, 182.16, 182.17, 182.18, 182.19, 183.02, 183.03, 183.13, 183.14; 371/67.1, 68.1, 68.2

[56] References Cited

U.S. PATENT DOCUMENTS 5,287,505  2/1994  Calvert et al. ...................... 395/610

FOREIGN PATENT DOCUMENTS 0347644  12/1989  European Pat. Off. .

*Primary Examiner*—Dieu-Minht T. Le
*Attorney, Agent, or Firm*—Hill & Simpson

[57] ABSTRACT

Program-controlled communications systems KA are connected with a service center SZ, and, in case of error, transmit error messages M to the service center SZ. The messages contain program-specific error information fi. Error information fi and allocated programs APSE provided for error removal are stored in the service center SZ. Through a comparison of the error information fi transmitted from the faulty communications system KA with the stored error information fi, the programs APSE provided for error removal can be determined. These programs APSE are thereupon transmitted to the faulty communications system KA, where they at least partly replace the previously used programs APS. The program change can ensue during on-going operation, if the transmitted programs APSE provided for error removal are stored in an additional memory ZSP and an at least partial switching over takes place to this additional memory ZSP. The error removal is considerably simplified by the method.

18 Claims, 3 Drawing Sheets

METHOD FOR REMOVING PROGRAM-RELATED ERRORS IN PROGRAM-CONTROLLED COMMUNICATIONS SYSTEMS

BACKGROUND OF THE INVENTION

Program-controlled communications systems are arrangements for the setting up and tearing down communications connections from and to communications terminal devices that are connected to respective communications system. Program-controlled communications systems also support other performance features during or outside of a communications connection. These communications systems are usually connected with further communications systems via public or private networks. A communications system of this type is described in European letters patent EP 0 347 644 B1.

In such a communications system, one or several programs are used that have components for the initialization of the communications system and for controlling the functions of the communications system, as well as application-specific components. These programs are loaded into memories of the communications system and, together with the at least one processor module allocated to the respective communications system, bring about the predetermined sequence of functions of the communications system.

However, through errors in the programs used, as well as through errors due to incompatibility of different program versions or databases, there are sporadic disturbances in the operation of the communications system. These errors, referred to as software residual errors, can be allocated to one or several programs and can be removed by exchanging the one or several programs. Furthermore, errors caused by switching-oriented factors, or errors not removable through program replacement, may also appear. In the communications system, after each appearance of an error an error message is generated and logged.

Furthermore, it is generally known that upon appearance of an error a communications system sets up a connection to a service center, and an error message is transmitted to the service center. In this service center, which functions as a "clearing house," the error message is displayed, and a removal of the error is manually initiated by an operator. For the errors that can be removed by the replacement of at least one of the programs in use in the faulty communications system, this means that the programs provided for the removal of the error must be chosen and supplied to the communications system. Previously, this took place through an exchange of the memory disk on location, that is at the communications system. The effectiveness of this service center is dependent on the continuous presence of an operator, and has the further consequence of a delay of the error removal due to the reaction time of the operator and the introduction of the transmission of the program.

SUMMARY OF THE INVENTION

It is an object of the present invention to provide simplified removal of program-related errors in communications systems that can be connected to a service center.

In general terms the present invention is a method for removing errors in communications systems that are controlled by programs and that are connectable to a service center. In the service center error information specific to programs of the communications systems is stored. This error information has at least one program provided for error removal allocated thereto. At least one error message formed in a respective communication system of the communications systems is transmitted from the respective communications system to the service center for indication of an error. In the service center, message error information contained in the error message is compared to the stored error information.

The at least one program provided for the removal of the error is transmitted by the service center to the respective communications system, when the message error information contained in the error message corresponds to the stored error message in the step of comparing. The transmitted at least one program provided for error removal in the respective communications system and incorporating the at least one program is stored into a current sequence of functions of the respective communications system.

The essential advantage of the inventive method lies in the acceleration and automation of error removal in the service center. The automation is effected by storing error information specific to the programs of the communications system in the service center and allocating programs provided for error removal to this information. After the arrival of an error message in the service center, error information contained in the error message is compared with the stored error information, and if these agree, the service center transmits the at least one allocated program provided for removal of the error to the communications system, where it is stored and incorporated into the sequence of functions.

According to an advantageous embodiment of the inventive method, an unambiguous error allocation is carried out, with formation of the error information through error classes, which designate at least one program, and through an error number specifies the cause of the error.

A further advantageous embodiment provides that additional identification information for the communications systems is stored in the service center, and, if an error message contains identification information, this identification information are incorporated into the comparison. In this way an unambiguous allocation of each error message to the transmitting communications system is possible without further additional messages. Furthermore, the identification information contains additional configuration data for the switching-oriented setting up of the communications system transmitting the error message. The configuration data is also stored in the service center and incorporated into the comparison. The configuration data concerning the switching-oriented configuration of the communications systems therefore does not have to be stored in the service center, if this configuration data is required in the selection of the programs provided for error removal.

Furthermore, a reference table is advantageously provided in the service center for the allocation of types of errors specified by the error information to the programs provided for error removal. This takes into account different switching-oriented and program-oriented configurations of the communications systems. This reference table is stored in a memory of the service center, can be updated at any time, and serves as a basis for comparison for the error information contained in the transmitted error messages. The allocation of the error information, through the taking into account of various switching-oriented and program-oriented configurations of the communications systems, is unambiguously organized.

An advantageous further construction enables the incorporation of the at least one program transmitted during the operation of the communications system, by loading the at least one program provided for error removal and transmitted from the service center into one of the additional memories allocated to the respective communications system. After the conclusion of the transmission, switching over takes place to this program provided for error removal and loaded into the additional memory, for the purpose of incorporating the at least one transmitted program. The sequence of functions of the communications system is thereby disturbed as little as possible, and interruptions of functioning are avoided.

Further embodiments of the inventive method provide for the logging of the errors not removable through the incorporation of the at least one transmitted program with indication of the identification information and of the error information and thereby for the enabling of the introduction of manual processing. The logging can also additionally be carried out for the removed errors. The programs provided for error removal are at least partly stored internally and/or externally in the service center and can thus be called very quickly for a transmission.

In general terms the present invention is also an arrangement for removing error in communications systems that are controlled by programs and that are connectable to a service center. A memory allocated to the service center, in which memory at least one reference table is stored, which can be influenced via input devices and which has error information specific to programs of the communications systems, respectively at least one program provided for error removal being allocated, to this error information. In the service center and in the communications systems additional devices are provided and are constructed so that at least one error message formed for error indication in one of the communications systems is transmitted from this communications system to the service center. In the service center, the error information contained in the error message is compared with the stored error information. In case of agreement, the allocated at least one program provided for removal of the error is transmitted to the communications system by the service center. The at least one transmitted program provided for error removal is stored in the communications system and is incorporated into the current sequence of functions of the communications system.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
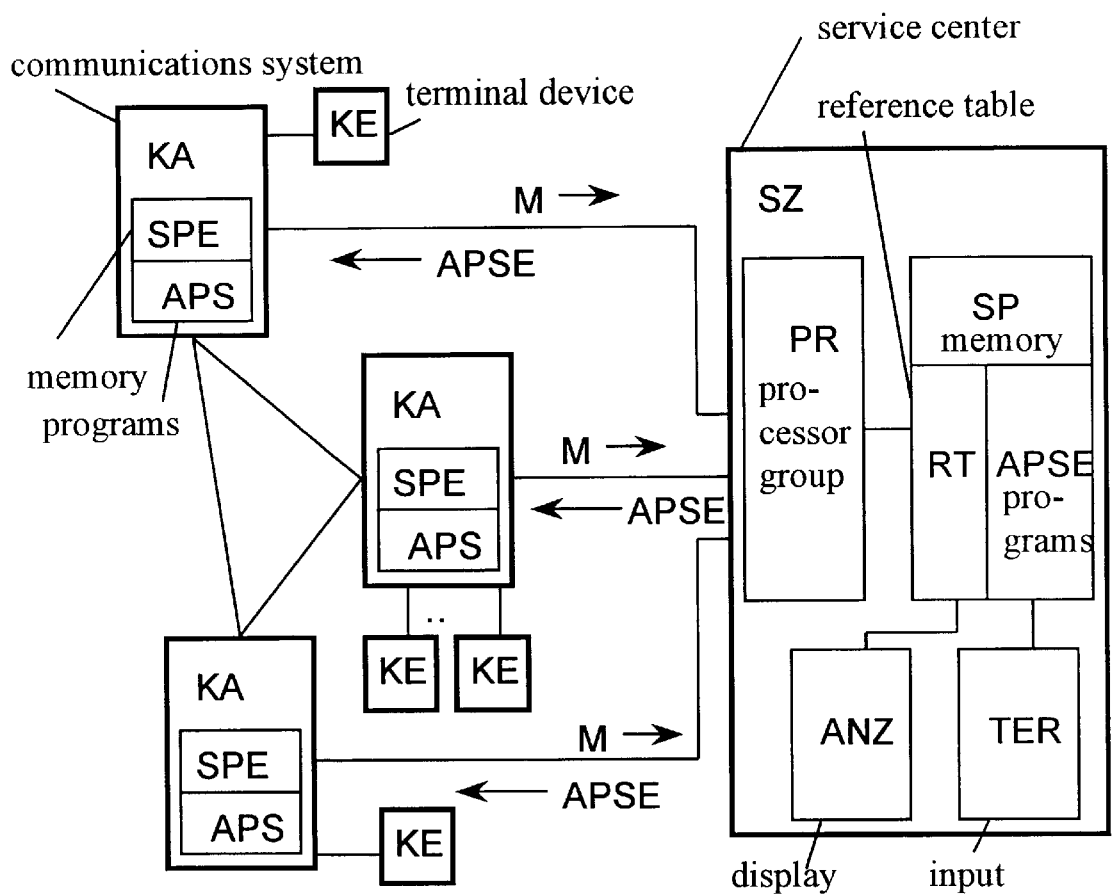
FIG. 1 shows an arrangement for carrying out the inventive method having a service center connected to communications systems.

The arrangement shown in FIG. 1 has a service center SZ and communications systems KA connected thereto at least intermittently. The three communications systems KA shown as examples are networked with one another for the setting up and tearing down and maintaining of communications connections from and to communications terminal devices KE. The communications systems KA are program-controlled, whereby the programs APS are contained in the memory SPE of the communications system KA and are processed by processor means (not shown). The communications terminal devices KE are respectively allocated to a communications system KA and can be connected to it. This can be done either by wirebound or wireless communications connections. The respective connections between the communications systems KA and the service center SZ are set up and torn down via the communications network that also connects the communications systems KA. However, separate connections or connections that are only intermittently made available can also be used.

Figure 2:
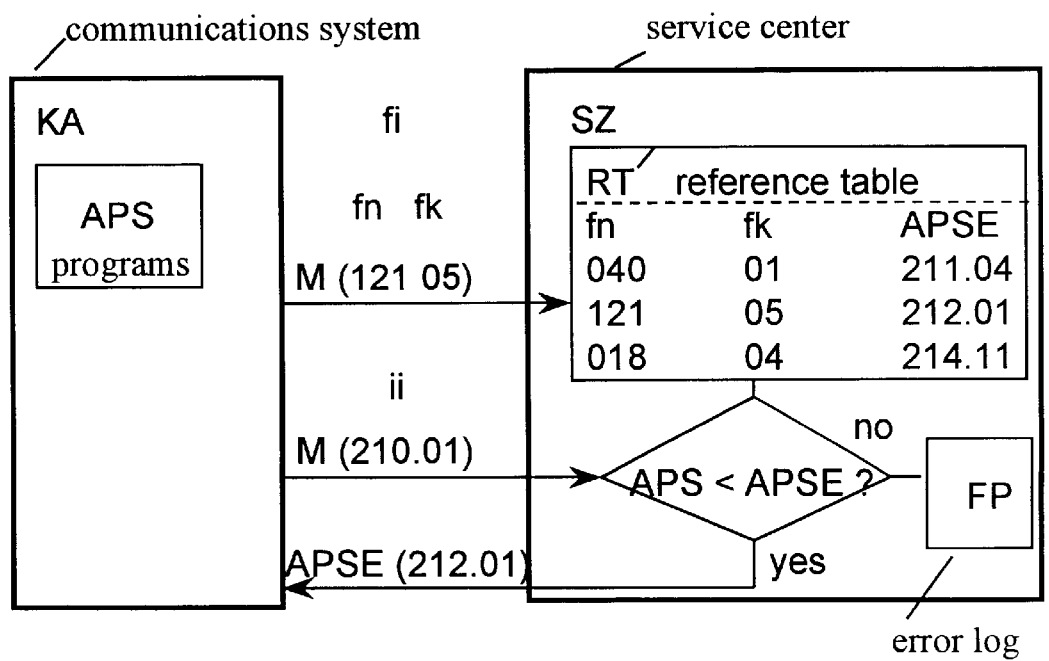
FIG. 2 shows the sequence of message transmission and program transmission between a respective communications system the service center.
Figure 4:
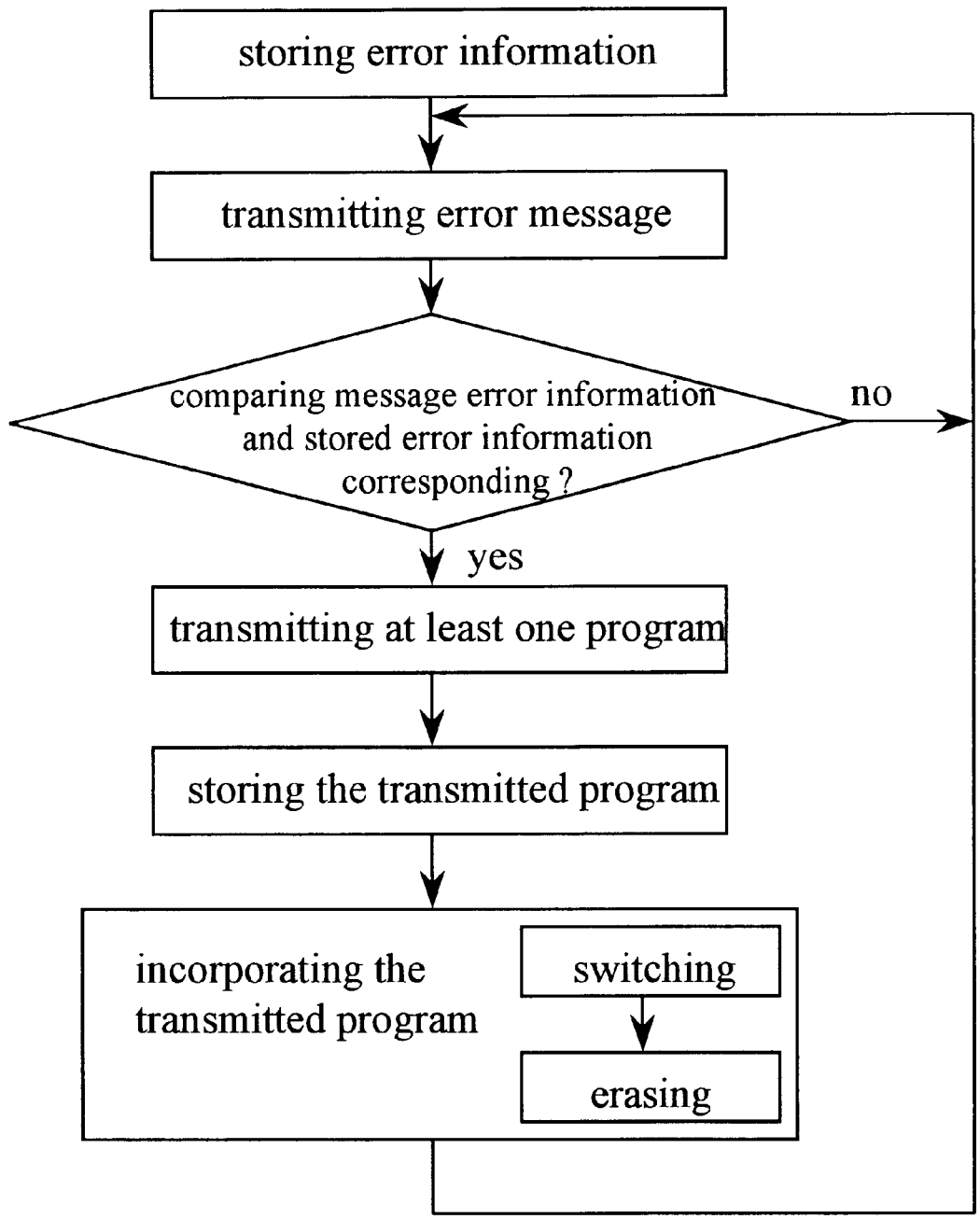
FIG. 4 is a flowchart of the present method.

The service center SZ is controlled by a processor group PR contained therein. The service center SZ also has a memory SP, which is connected with the processor group PR as well as with input means TER and with display means ANZ. The connection of the modules of the service center SZ can alternatively ensue via a common system bus. As service center SZ, a personal computer (not shown) with a communications network connection, for example, a modem, may for example be used. In the memory SP, besides programs for controlling the service center SZ, a reference table RT and programs APSE are stored, whereby the programs APSE are provided for use in the communications systems KA, in order to replace there the faulty programs APS according to the method for error removal. The programs APS, APSE are for example parts of a system program system and contain functions such as for example, the control of the input/output processors, a means known as a "device handler," various applications programs and the operating programs. The connections between the communications systems KA and the service center SZ enable both the transmission of error messages M from a communications system KA to the service center SZ and the transmission of programs APSE, provided for error removal, from the service center SZ to the faulty communications system KA. FIG. 2 shows a faulty communications system KA having at least one faulty program APS and FIG. 4 is a flowchart of the present method. In the communications system KA, error messages M are generated and transmitted to the service center SZ, whereupon the communications system KA receives transmitted programs APSE, provided for the removal of the error, from the service center SZ. The first error message M contains an error information fi, which indicates to the service center SZ the error number fn (121) and the error class fk (05). Here the error numbers fn designate the causes or, respectively, the symptoms of the error, and the error class fk designates at least one program APS used in the communications system KA.

The service center SZ contains the reference table RT. In this reference table RT, the error numbers fn and error classes fk contained in the error information fi are allocated to programs APSE, which are provided for the removal of errors in the communications systems KA through the replacement of programs APS used there. This reference table RT can be altered and updated by the input means TER shown in FIG. 1 and can be visualized through the display means ANZ. The reference table RT contains only unambiguous allocations of error information fi to programs APSE provided for error removal.

After the arrival of the first error message M, a comparison of the transmitted error information fi (121 05) with the error information fi (040 01, 121 05, 018, 04) contained in the reference table RT is carried out in the service center SZ. In case of agreement of the transmitted error information fi (121 05) with a stored error information fi (121 05), the program or programs APSE (212.01) provided for error removal are identified.

As a supplement to the first error message M, a second error message M having an additional identification information ii (210.01) is generated and transmitted to the service center SZ. The information from the first and second error messages M can also be combined in a single error message, that is, in the first error message M. The identification information ii comprises the designation (not shown) of the faulty communications system KA and additional data concerning the programs APS used in the communications system KA. These data can also be supplemented with switching-related data (not shown).

In the service center SZ, a test is subsequently carried out to determine whether the version of the at least one program APS (210.01) previously used in the communications system KA is an older program version than the version of the at least one program APSE (212.01) available in the service center SZ. It is also determined whether an error removal by means of replacement of the at least one program APS previously used in the communications system KA by the at least one program APSE provided for error removal is possible. If the test indicates that the error is removable, the at least one program APSE provided for the removal of the error is transmitted to the communications system.

If no error removal of this type is possible, an error logging is initiated. The error log FP comprises both error information fi and the data ii that identifies the faulty communications system KA. In the service center SZ, it is possible by means of the input means TER and the display means ANZ to gain access to this error log FP and to initiate other error removal measures. The transmission of the at least one program APSE provided for error removal between the service center SZ and the communications system KA ensues, if it is not immediately required, at times of low traffic or, respectively, low rates. The transmission can be preset for nighttime hours through the service center SZ.

Figure 3:
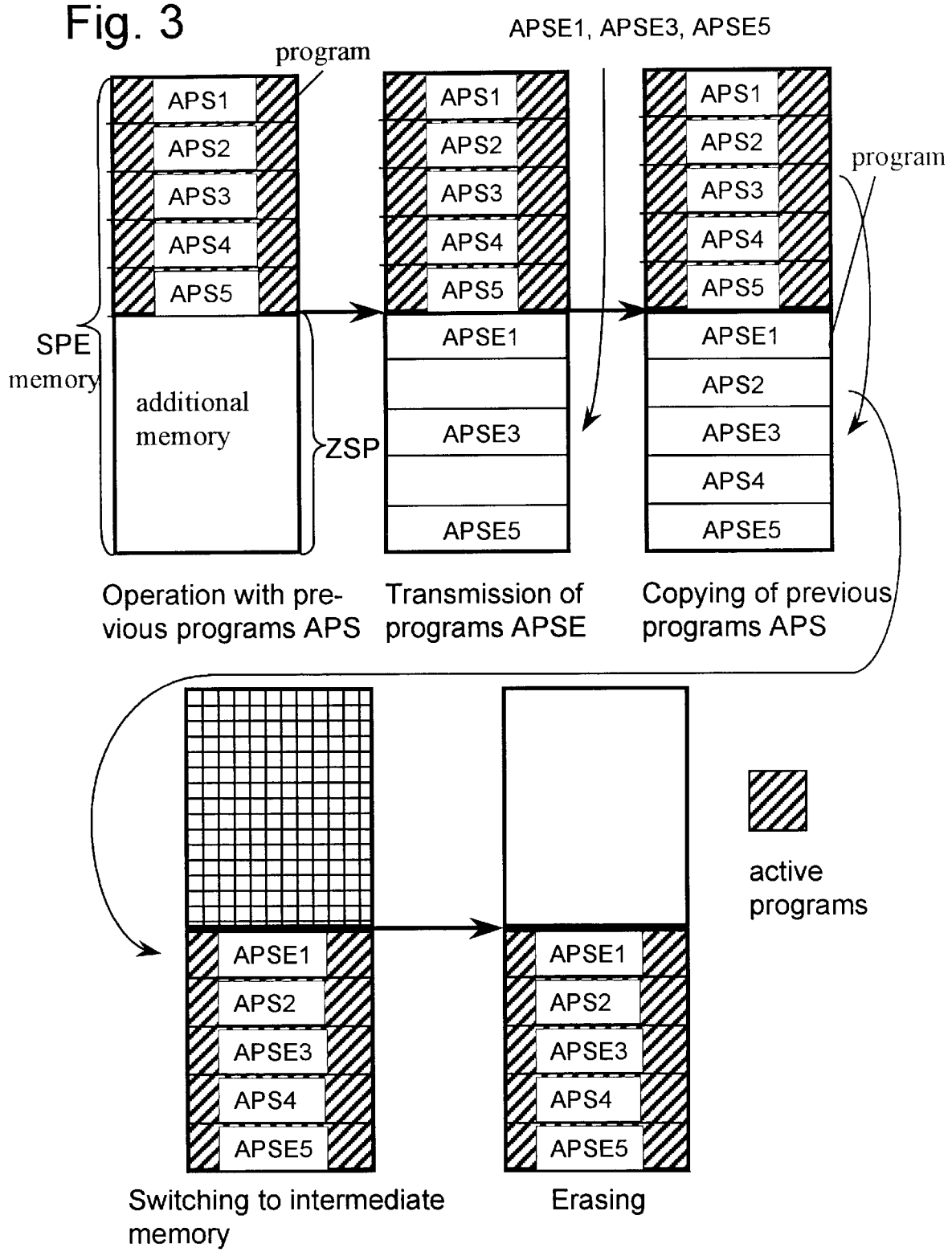
FIG. 3 shows the replacement of the previously used programs by the transmitted programs in a communications system.

The replacement, during running operation, of the previously used programs APS in the communications system KA by the transmitted programs APSE provided for error removal is explained on the basis of FIG. 3. A communications system KA has at its disposal at least one memory SPE having a memory area that permits at least the twofold storing of programs APS, APSE that are exchangeable according to the present invention. Even after the appearance of the error, the faulty communications system KA operates at least partially with the previously used programs APS. As an example, five programs APS1–APS5 are assumed in FIG. 3.

Before a transmission of the programs APSE provided for error7lXremovaltests are carried out to determine whether an adequate additional memory ZSP is present in the communications system KA, and whether the memory area thereof is not write-protected. If these tests are successful, it is asked which areas in the additional memory ZSP are available. In addition, as an additional security measure it is possible to copy the subscriber data, that is, the data concerning the communications terminal devices KE that is currently connected to or can be connected with the communications system KA.

If these preparatory measures for program transmission have been taken, the three example programs APSE1, APSE3, APSE5 provided for error removal are transmitted from the service center SZ to the communications system KA and stored in the additional memory ZSP. The transmitted programs APSE1, APSE3, APSE5 are supplemented with already previously used programs APS2, APS4 in the additional memory ZSP through copying, in order to produce a fully functional program system in the communications system KA. Transmitted programs APSE provided for error removal can under some circumstances respectively replace several previously used programs APS, or several programs APSE to be transmitted may be necessary for the replacement of one previously used program APS. The construction of new program versions APSE is not restricted by a previous partitioning of the functions of the communications system KA to the individual previously used programs APS. The specialization or, respectively, generalization of the programs APSE provided for error removal is respectively possible for various switching-oriented constructions of communications systems KA. For each transmitted program APSE1, APSE3, APSE5, or a part thereof, a bit test is carried out after the transmission to test for transmission errors. If an error is determined, the faulty program segment is erased, the transmission connection is broken off and a new transmission may be initiated.

Subsequently, another bit test is carried out for the program system loaded completely in the additional memory ZSP and provided for error removal. If this is successful, the measures are initiated for switching over to the program system provided for error removal. The switching over may take place at once or may be delayed. The delay time can be preset. Before switching over to the program system provided for error removal, this program system is initialized.

The transmission of the program system APSE provided for error removal and the switching over to the program system provided for error removal can be broken off at any time by the service center SZ. In this case, the communications system KA is controlled back into the previous state. After the switching over, the previously used programs APS1, APS3, APS5 can be at least partly erased, so that sufficient memory space is again available if further errors appear. During the transmission of the programs APSE1, APSE3, APSE5 provided for error removal, and during the switching over, error-specific and process-specific logging messages FP are produced and stored in a logging memory, whose content can be transmitted to the service center SZ or can be requested by it.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for automatically removing errors in communications systems that are controlled by programs and that are connectable to a service center, comprising the steps of:

storing in the service center error information specific to programs of the communications systems, said error information respectively having at least one program provided for automatic error removal allocated thereto;

transmitting at least one error message formed in a respective communication system of the communications systems from said respective communications system to the service center for indication of an error;

comparing in the service center, message error information contained in the error message the stored error information;

transmitting by the service center the at least one program provided for the removal of the error to the respective communications system, when the message error information contained in the error message corresponds to the stored error message in the step of comparing;

storing the transmitted at least one program provided for error removal in the respective communications system and automatically incorporating the at least one program into a current sequence of functions of the respective communications system; and wherein each step of the method occurs automatically without operator intervention.

2. The method according to claim 1, wherein incorporation of the transmitted at least one program provided for error removal into the current sequence of functions of the respective communications system is effected through replacement of at least one program previously incorporated into the sequence of functions of the respective communication system with the transmitted at least one program.

3. The method according to claim 1, wherein the error information comprises an error class of the error, which designates at least one program, and an error number which specifies a cause of the error.

4. The method according to claim 1, wherein identification information for the communications systems is stored in the service center as part of the stored error information, and wherein if message identification information is contained in an error message, said message identification information is utilized in the comparison of the message error information transmitted and the stored error information.

5. The method according to claim 4, wherein the identification information has configuration data for a switching-oriented configuration of the respective communications system, and wherein the configuration data is also stored in the service center as part of the stored error information and is utilized in the comparison of the message error information and the stored error information.

6. The method according to claim 1, wherein the method further comprises providing in the service center a reference table for allocation of types of errors specified by the error information to the programs provided for error removal, taking into account various switching-oriented and program-oriented configurations of the communications systems.

7. The method according to claim 1, wherein the incorporation of the at least one transmitted program provided for error removal ensues during operation of the respective communications system, by respectively loading said at least one program transmitted from the service center into at least one additional memory allocated to the respective communications system, and wherein, for replacement of an at least one program previously incorporated into the sequence of functions, an at least partial switching over takes place to the at least one program respectively loaded into the at least one additional memory and provided for error removal.

8. The method according to claim 1, wherein errors not removable by incorporation of the transmitted at least one program provided for error removal are logged in the service center, with indication of the identification information and of the error information.

9. The method according to claim 1, wherein programs provided for error removal are stored internally and/or externally at least partly in the service center.

10. The method according to claim 1, wherein the at least one error message is displayed in the service center.

11. An arrangement for automatically removing error in communications systems that are controlled by programs and that are connectable to a service center, comprising:

the service center having a memory, in which memory at least one reference table is stored, which is influenced via input devices and which has error information specific to programs of the communications systems, respectively at least one program provided for error removal being allocated to said error information;

the service center and the communications systems each having additional devices that are structured so that at least one error message formed for error indication in one of the communications systems is transmitted from said one of the communications system to the service center, the error information contained in the error message being compared in the service center with the stored error information, in case of agreement, the allocated at least one program provided for removal of the error is transmitted to the communications system by the service center, and the at least one transmitted program provided for error removal being stored in the communications system and being automatically incorporated into the current sequence of functions of the communications system;

wherein errors are automatically removed without operator intervention.

12. A method for automatically removing errors in communications systems that are controlled by programs and that are connectable to a service center, comprising the steps of:

storing in the service center error information specific to programs of the communications systems, said error information respectively having at least one program provided for automatic error removal allocated thereto, the error information has an error class of the error, which designates at least one program, and an error number which specifies a cause of the error;

storing in the service center identification information for the communications systems as part of the stored error information, the identification information having configuration data for a switching-oriented configuration of the respective communications system, the configuration data also being stored in the service center as part of the stored error information;

transmitting at least one error message formed in a respective communication system of the communications systems from said respective communications system to the service center for indication of an error;

comparing in the service center, message error information contained in the error message the stored error information, and if message identification information is contained in an error message, said message identification information is utilized in the comparison of the transmitted message error information and the stored error information;

transmitting by the service center the at least one program provided for the removal of the error to the respective communications system, when the message error information contained in the error message corresponds to the stored error message in the step of comparing;

storing the transmitted at least one program provided for error removal in the respective communications system and automatically incorporating the at least one program into a current sequence of functions of the respective communications system; and wherein each step of the method occurs automatically without operator intervention.

13. The method according to claim 12, wherein incorporation of the transmitted at least one program provided for error removal into the current sequence of functions of the respective communications system is effected through replacement of at least one program previously incorporated into the sequence of functions of the respective communication system with the transmitted at least one program.

14. The method according to claim 12, wherein the method further comprises providing in the service center a reference table for allocation of types of errors specified by the error information to the programs provided for error removal, taking into account various switching-oriented and program-oriented configurations of the communications systems.

15. The method according to claim 12, wherein the incorporation of the at least one transmitted program provided for error removal ensues during operation of the respective communications system, by respectively loading said at least one program transmitted from the service center into at least one additional memory allocated to the respective communications system, and wherein, for replacement of an at least one program previously incorporated into the sequence of functions, an at least partial switching over takes place to the at least one program respectively loaded into the at least one additional memory and provided for error removal.

16. The method according to claim 12, wherein errors not removable by incorporation of the transmitted at least one program provided for error removal are logged in the service center, with indication of the identification information and of the error information.

17. The method according to claim 12, wherein programs provided for error removal are stored internally and/or externally at least partly in the service center.

18. The method according to claim 12, wherein the at least one error message is displayed in the service center.

* * * * *